United States Patent
Johnson et al.

(10) Patent No.: US 12,461,793 B2
(45) Date of Patent: Nov. 4, 2025

(54) INITIATOR-SIDE OFFLOAD FOR SCALE-OUT STORAGE

(71) Applicant: Intel Corporation, Santa Clara, CA (US)

(72) Inventors: Salma Mirza Johnson, Littleton, MA (US); Jose Niell, Franklin, MA (US); Bradley A. Burres, Newton, MA (US); Yadong Li, Portland, OR (US); Scott D. Peterson, Beaverton, OR (US); Tony Hurson, Austin, TX (US); Sujoy Sen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 17/560,881

(22) Filed: Dec. 23, 2021

(65) Prior Publication Data

US 2022/0114030 A1 Apr. 14, 2022

Related U.S. Application Data

(60) Provisional application No. 63/246,210, filed on Sep. 20, 2021.

(51) Int. Cl.
*G06F 9/50* (2006.01)
*G06F 9/4401* (2018.01)
*G06F 16/901* (2019.01)

(52) U.S. Cl.
CPC .......... *G06F 9/5077* (2013.01); *G06F 9/4411* (2013.01); *G06F 16/9014* (2019.01); *G06F 16/9017* (2019.01)

(58) Field of Classification Search
CPC .. G06F 3/067; G06F 15/17331; G06F 3/0611; G06F 3/0614; G06F 3/0659
See application file for complete search history.

(56) References Cited

U.S. PATENT DOCUMENTS

| | | | |
|---|---|---|---|
| 10,592,144 B2 | 3/2020 | Roberts et al. | |
| 10,936,200 B2 | 3/2021 | Romem et al. | |
| 12,086,431 B1* | 9/2024 | Dreier | G06F 16/1827 |
| 2016/0043965 A1 | 2/2016 | Goldenberg et al. | |
| 2019/0042144 A1 | 2/2019 | Peterson et al. | |
| 2019/0068698 A1* | 2/2019 | Kumar | G06F 11/3442 |
| 2020/0136996 A1 | 4/2020 | Li et al. | |
| 2020/0293499 A1* | 9/2020 | Kohli | G06F 3/067 |

(Continued)

FOREIGN PATENT DOCUMENTS

WO 2009111288 A1 9/2009

OTHER PUBLICATIONS

International Search Report and Written Opinion for PCT Patent Application No. PCT/US22/40590, Mailed Dec. 5, 2022, 11 pages.

*Primary Examiner* — Brian W Wathen
(74) *Attorney, Agent, or Firm* — Compass IP Law PC

(57) ABSTRACT

Examples described herein relate to a network interface device that includes circuitry to perform operations, offloaded from a host, to identify at least one locator of at least one target storage associated with a storage access command based on operations selected from among multiple available operations, wherein the available operations comprise two or more: entry lookup by the network interface device, hash-based calculation on the network interface device, or control plane processing on the network interface device.

21 Claims, 6 Drawing Sheets

(56) References Cited

U.S. PATENT DOCUMENTS

2022/0334727 A1* 10/2022 Xing ..................... G06F 3/0653
2022/0334989 A1* 10/2022 Bar-Ilan .............. G06F 9/45558
2022/0377013 A1* 11/2022 Doddapaneni .......... H04L 45/38

* cited by examiner

INITIATOR-SIDE OFFLOAD FOR SCALE-OUT STORAGE

RELATED APPLICATION

The present application claims the benefit of priority of U.S. Provisional application Ser. No. 63/246,210, filed Sep. 20, 2021. The contents of that application is incorporated herein in its entirety.

BACKGROUND

Data centers provide Virtual Machines (VMs) and containers with access to block addressable storage. Block addressable storage devices can include memory devices based on NAND or NOR technologies. A block can be any size such as but not limited to 512 B, 4 KB, 8 KB, and so forth. Ephemeral block level storage can be tied to a single compute instance (e.g., VM or container) and once the instance is stopped, access to the data is lost. Persistent block level storage is independent of compute instances and can be attached or detached from execution of an instance. Data on persistent volumes is not lost when an instance stops executing.

Storage volumes can be directly attached to a host that executes a VM or container, but the capacity of such local storage can be underutilized or over-constrained. Direct attached storage also presents infrastructure challenges when migrating a VM or container to a different host, resulting in the original storage volume no longer being directly attached. Remote disaggregated storage architectures provide storage servers that are remote from compute nodes and accessed over a network via a network interface. The host can perform mapping of data to locations accessible via a network using open source software stacks such as Ceph.

DETAILED DESCRIPTION

Figure 1:
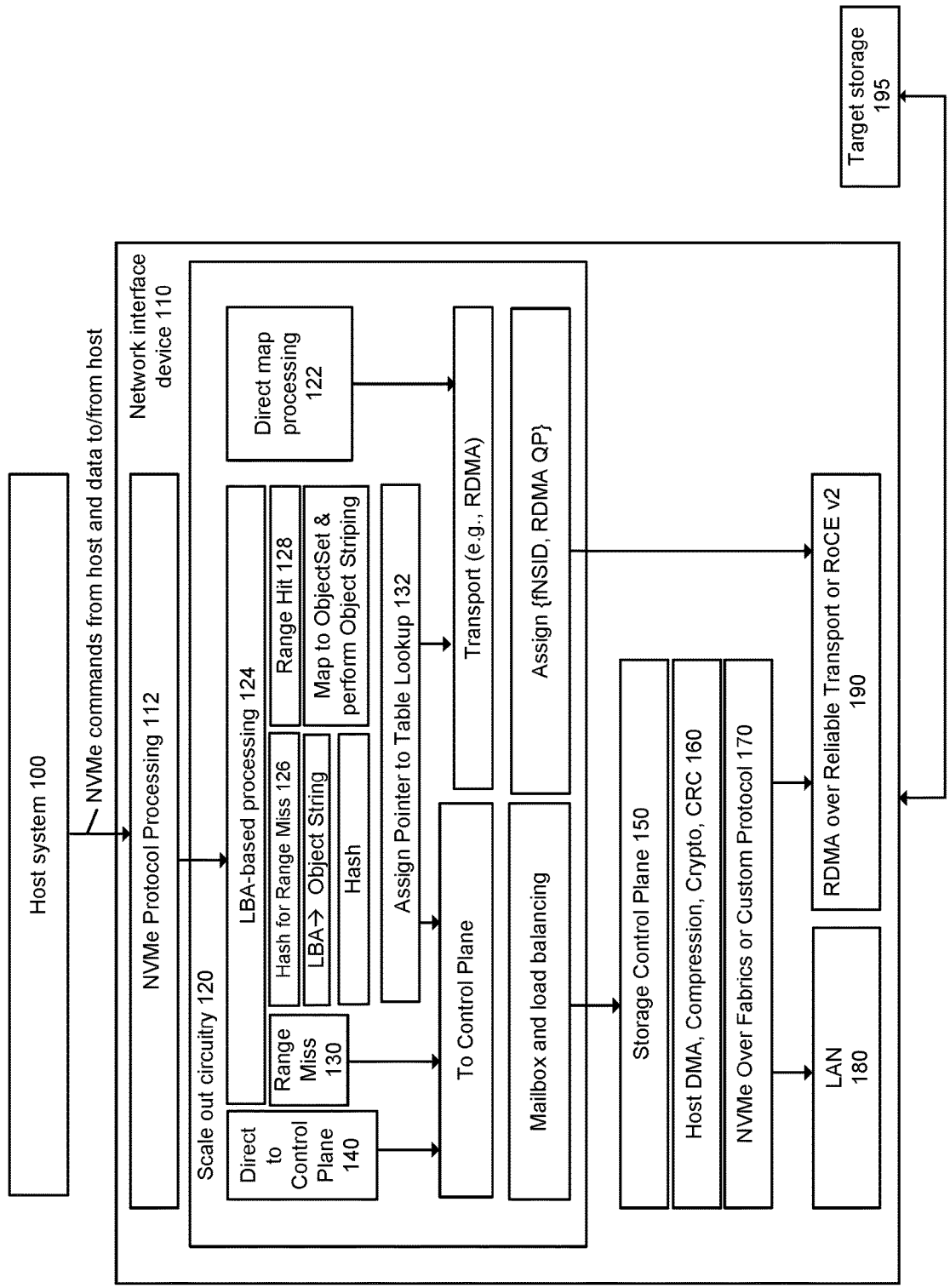
FIG. 1 depicts an example system.

A remote disaggregated scale-out storage (SoS) initiator circuitry can be offloaded from performance by a host to performance by a network interface device. In some examples, the network interface device includes programmable circuitry that can map Non-volatile Memory Express (NVMe) commands to target network-accessible storage locations. Examples of operations performed by network interface device can include one or more of: determining one or more pointers to Queue Pair(s) (QPs) and RDMA connection context(s) for a command by lookup or calculation or sending the command to control plane for further processing. The programmable circuitry can send, to the processor-executed control plane, requests to manage exceptions, such as alignment errors, fabric failures, or when connections are not made with nodes in a distributed storage system.

Disaggregated SoS initiator circuitry can be programmed through software accessible registers (e.g., Control and Status Register) or configuration registers. The host can send NVMe-consistent input output (IO) operations (e.g., data read or write requests) to the network interface device regardless of whether a connection to a target node is available. If the network interface device can initiate connections to nodes in a distributed storage system, then the programmable circuitry can manage performance of the IO operations. If the network interface device cannot identify or form a connection to one of the storage nodes, but can form a second connection with a target storage node, then the network interface device's processor-executed software can configure tables, accessible to the programmable circuitry, with mappings of IO operations to target storage nodes or with values that can be used to perform calculations that map an NVMe command to a remote storage target or targets. In some examples, the connection is based on remote direct memory access (RDMA or others) and the second connection can be based on a reliable transport protocol (e.g., TCP, UDP, or others).

Accordingly, data centers can implement remote disaggregated storage, without incurring the software overhead of using cores in servers to map IO requests to remote storage devices. Circuitry and processors of a network interface device can map IO requests to remote storage devices.

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), as well as predecessors, successors, and proprietary variations thereof. NVMe allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

Distributed block storage systems provide block device functionality to applications by presenting logical block devices that are stored in segments scattered across a large pool of remote storage devices. To use these logical block devices, applications determine the location of the segments to access. A computing platform can access a storage device using a fabric or network. Various storage protocols exist that enable access to storage devices using a network or fabric. For example, the Non-volatile Memory Express over Fabrics (NVMe-oF) specification is designed to enable access to remote NVMe compatible solid state drives (SSDs). For example, NVMe-oF is described at least in NVM Express Base Specification Revision 1.4 (2019), as well as predecessors, successors, and proprietary variations thereof. NVMe-oF compatible devices provide high performance NVMe storage drives to remote systems accessible over a network or fabric.

FIG. 1 depicts a high-level view of a system that uses a network interface device to perform storage access operations. Host system 100 can include one or more processors that execute processes that request data read or write operations. For example, a process can issue an NVMe commands to request data read or data write operations to network interface device 110.

Network interface device 110 can be implemented as one or more of: a network interface controller (NIC), a remote direct memory access (RDMA)-enabled NIC, SmartNIC, router, switch, forwarding element, infrastructure processing unit (IPU), data processing unit (DPU), or network-attached appliance or smart end point (e.g., storage, memory, accelerator, processors, security), and so forth. NVMe drives can be hot-plugged into a smart endpoint (SEP) switch or network interface device or accessible via a server.

NVMe protocol processing 102 can process NVMe commands and data, command completions, and perform data encryption. NVMe protocol processing 102 can output an NVMe command (iCMD), pointers to data, and encrypted data or unencrypted data. An NVMe command can identify at least a starting logical block address (LBA), logical block range, and NSID for the command.

Scale out circuitry 120 can perform operations of an initiator to scale out storage using NVMe over RDMA, or other protocols. Scale out circuitry 120 can receive NVMe commands from a NVMe protocol processing 112. Examples of operations performed by scale out circuitry 120 include one or more of: determining one or more pointers to Queue Pair(s) (QPs) and RDMA connection context(s) for the command by lookup or calculation, sending the command to control plane 150 for further processing, or sending the command to the attached RDMA transport bridge (RTB).

Received read or write commands can include starting LBA and number of blocks to access as well as a translated virtualized NSID from a sender process (e.g., VM or container). Scale out circuitry 120 can access a table (e.g., indirection table) or data structure to determine how the command is to be processed based on the command and associated NSID. The table can be configured by a control plane based on a discovery service that determines devices where data is stored. Scale out circuitry 120 allows control plane software to change the contents of the table, without affecting in-flight commands, or the flow of incoming commands into scale out circuitry 120.

Scale out circuitry 120 can process a received command according to one or more of the following: direct mapped processing, control plane processing, or range look up based on logical block address (LBA) associated with a command. If it is determined that a range check in a Range Indirection Table lead to a miss, then a hashing flow is followed. Note that a range miss can be utilize the hashing flow. In some cases, scale out circuitry 120 could be configured to redirect storage traffic to another system, until the system can be brought back online by creating "traps" or range hits in the Range Indirection Table.

Direct mapped processing 122 of the command can utilize a table to identify a pointer to a table to map NSID and NVMe submission queue (SQ) to a fabric NSID and RDMA QP.

Based on an NSID associated with a received command, scale out circuitry 120 can determine to send the command for processing directly to control plane 150. Control plane 150 can be implemented using processor-executed software. The command format sent to Control Plane Software can be identified an iCMD, where an iCMD may have one or more RDMA {connection_id, fNSID} tuples. Commands may be sent for processing by control plane 150 in various scenarios. A first scenario is where an NSID Indirection Table indicated that hardware offload for the NSID is not supported, and commands from that NSID should be sent to Control Plane Software for processing. A second scenario is the outcome of a lookup operation cause the command to be processed by control plane 150 and control plane 150 interfaces with RDMA to send the command over the network. A third scenario is during lookups, a condition is identified that a hardware processor could not resolve (e.g., Range or Striping Lookups, but the LBA did not fall within the ranges). Other scenarios are possible and control plane 150 can be configured to handle other scenarios. Control plane 150 can determine if this is a condition for which hardware tables of direct map processing 122 are to be updated, or if this is an exception case and it will continue to handle commands of the NSID with no table updates.

Control plane 150 can update lookup tables of scale out circuitry 120 with a new range, then recirculate the command through scale out circuitry 120 by re-injecting it using a queue and doorbell. This could save a processor the overhead of processing an exception path, or processing the first packet in an often-used path that was missed. Control plane 150 can re-inject a command into scale out circuitry 120 to be transmitted. Control plane 150 could update tables accessible to assign {fNSID and RDMA QP} to map drives to a network location.

Control plane 150 can learn a flow to determine a manner to process the command associated with the flow and how to process other commands in the same flow. Control plane 150 can program a table accessed by scale out circuitry 120 to determine how to process other commands in the same flow. After processing by control plane 150, a command can be sent for transmission by RDMA over reliable transport or to a local area network (LAN). Control plane 150 can perform a configuration operation including data encryption and sending the data in a packet to network using local area network (LAN) 180 using TCP or RDMA over reliable transport 190.

At a request from control plane 150, the command can be sent to a Hardware Remote Transport Bridge (RTB), which interfaces with the RDMA hardware. As described herein, a command may have been broken into two or more commands, depending on whether the LBA of the command straddles two or more objects.

LBA-based processing 124 can perform range look up based on LBA associated with a command. An LBA can represent a block number associated with an address range (e.g., 4 KB). Range miss 130 processing can identify an LBA that is not within an LBA range corresponding to one or more object sets supported by LBA-based processing 124. LBAs of command may not be translated using a table entry accessible by LBA-based processing 124. Range miss 130 processing can cause the command to be process by storage control plane 150 or utilize hash for range miss 126.

Hash for range miss 126 can identify one or more objects associated with an LBA using a table look up to assign a string, an operation on the string to generate hash (e.g., Ceph Jenkins hash or other hash), and a modulo operation of the hash to generate a pointer to a table that identifies RDMA {connection_id, fabric NSID (fNSID)} that the NVMe command maps-to. Assign pointer to table lookup 132 can identify the pointer to a table.

Hash for range miss 126 can send a command number that is to be processed to storage control plane 150, along with additional information that resulted from the hardware offloads, such as RDMA {connection_id, fNSID} and output of a hash operation. For the hashing flow, a prestring and Object String are associated with an NSID and can be available in a Hash PreString Lookup Table. The objectID number can be calculated based on the LBA and Object Size of the NVMe request. The objectID can be reformatted as an objectString, and concatenated with the PreString, to create an ObjectString. The ObjectString can be processed using a Jenkins Hash, and condensed to 32-bits, or other size. The bits can be further pruned using a stable_mod function. The pruned output can be used to index into a larger Global Lookup Table, described herein. One or more hash pools, which may be assigned to Ceph hash pools, can be supported. An index into the Global Lookup Table can be calculated as follows:

GlobalLookupTableIndex=GlobalLookupTableBase [HashPool]+GlobalLookupTablePtr

Scale out circuitry 120 can be implemented by one or more of: processor-executed software, circuitry, application specific integrated circuits (ASICs), field programmable gate arrays (FPGAs), and so forth. Scale out circuitry 120 can include multiple instantiations of hash calculation engines. In some examples, Jenkins Hash can be used as a hash operation. Jenkins Hash can use a programmable initial seed, which is implemented as a value in a register in hardware.

Scale out circuitry 120 can be programmed in one or more of: lookup table contents, base address of tables that are extended in memory, stable_mod function mod value (b), hash seed for Jenkins Hash, hash PreString Size (e.g., 32 B-128 B) and prestring table, hash command submission queue base address, or read statistics to help identify how often table entries are used. For example, scale out circuitry 120 can be programmed by writing to registers.

Based on an LBA that is within an LBA range corresponding to one or more object sets supported by LBA-based processing 124, range hit 128 can process the command. For example, redirecting a command to a target storage device can occur by configuring the LBA range corresponding to one or more object sets supported by LBA-based processing 124. An object set can include one or more objects. When an object set includes more than one object, objects can be striped across the object set. The following can be configurable per range: Object Size, Number of Objects per Object Set, and Stripe Size.

A command's LBAs can be within an object stripe, straddle stripes of different objects, or straddle two object sets. Map to ObjectSet and perform Object Striping can provide one or more commands with object ID(s), depending on a number of object sets that are straddled. Assign pointer to table lookup 132 can identify a pointer to a table based on object ID. Assign {fNSID and RDMA QP} can identify an fNSID and RDMA QP based on object ID using a table identified by a pointer.

The table can include a Global Lookup Table (GLT) that is accessible via a network or fabric using a network interface device. In some examples, the GLT can be stored in memory or storage of network interface device 110. In other examples, GLT can be accessible via a network using one or more packet transmissions and receipts. A lookup in the GLT can be performed to generate one or more entries of RDMA {connection_id, fabric NSID (fNSID)} that the NVMe command maps-to. The RDMA {connection_id, fabric NSID (fNSID)} can refer to one or more devices including one or more of: a server, cluster of servers, a gateway to one or more servers and/or storage devices, or one or more storage devices.

Where a command requests a data write to a target device, a write can be made to a particular object set or striped across multiple objects (e.g., Redundant Array of Independent Disks Mode 0).

One or more commands can be sent from network interface device 110 to one or more target devices using NVMe-oF or another protocol using TCP, UDP, Remote Direct Memory Access (RDMA) over Converged Ethernet (RoCE) v2, and so forth.

Figure 2:
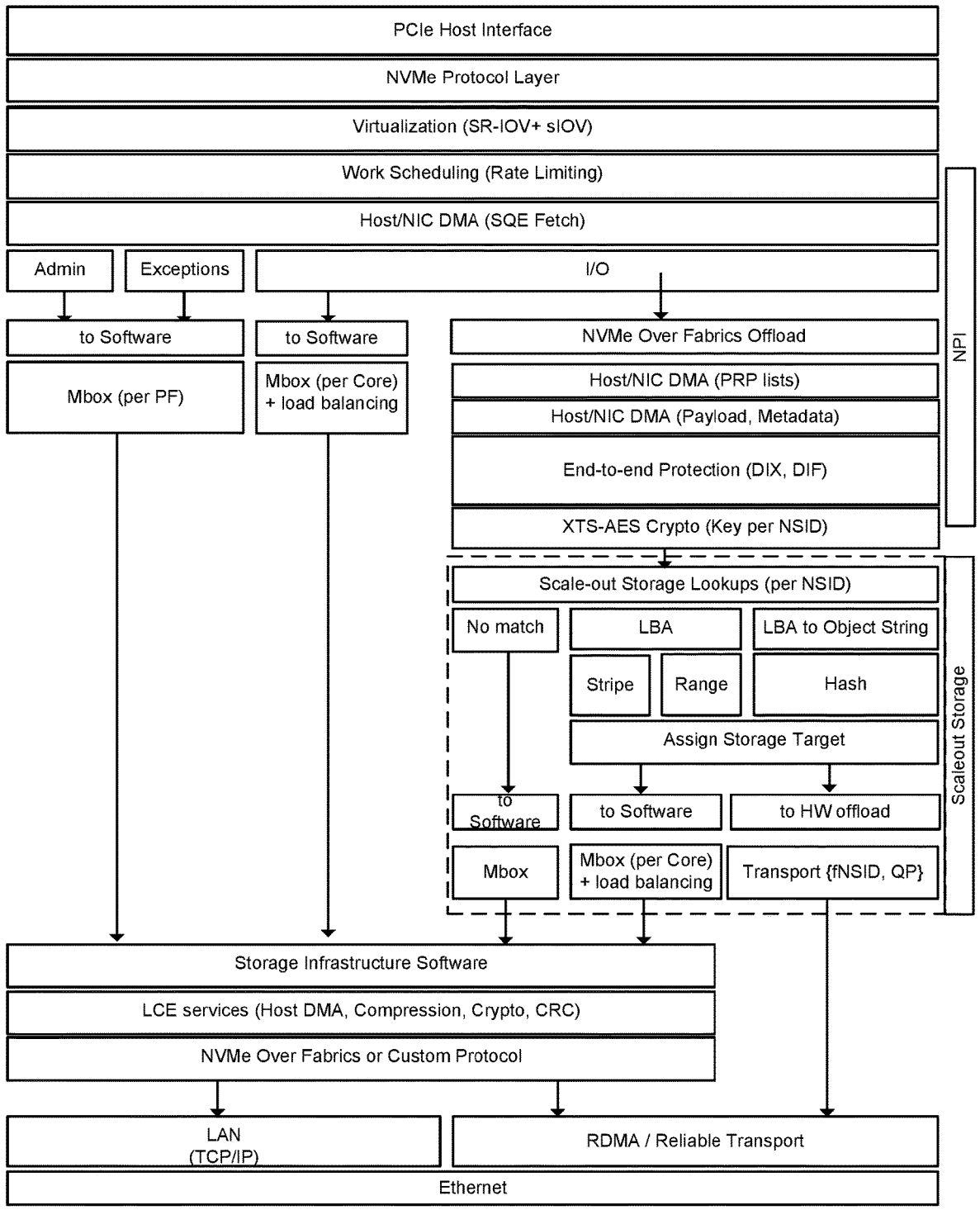
FIG. 2 depicts an example system.

FIG. 2 depicts an example system. The system can include scale out circuitry 120 and other component of network interface device 110. Storage access commands such as NVMe commands can be received via a host interface (e.g., PCIe, CXL, or others) and provided for processing using scale out circuitry 120 or other paths. Packets with NVMe commands targeted to destination devices can be transmitted using a local area network (LAN) or via RDMA with reliable transport.

Figure 3:
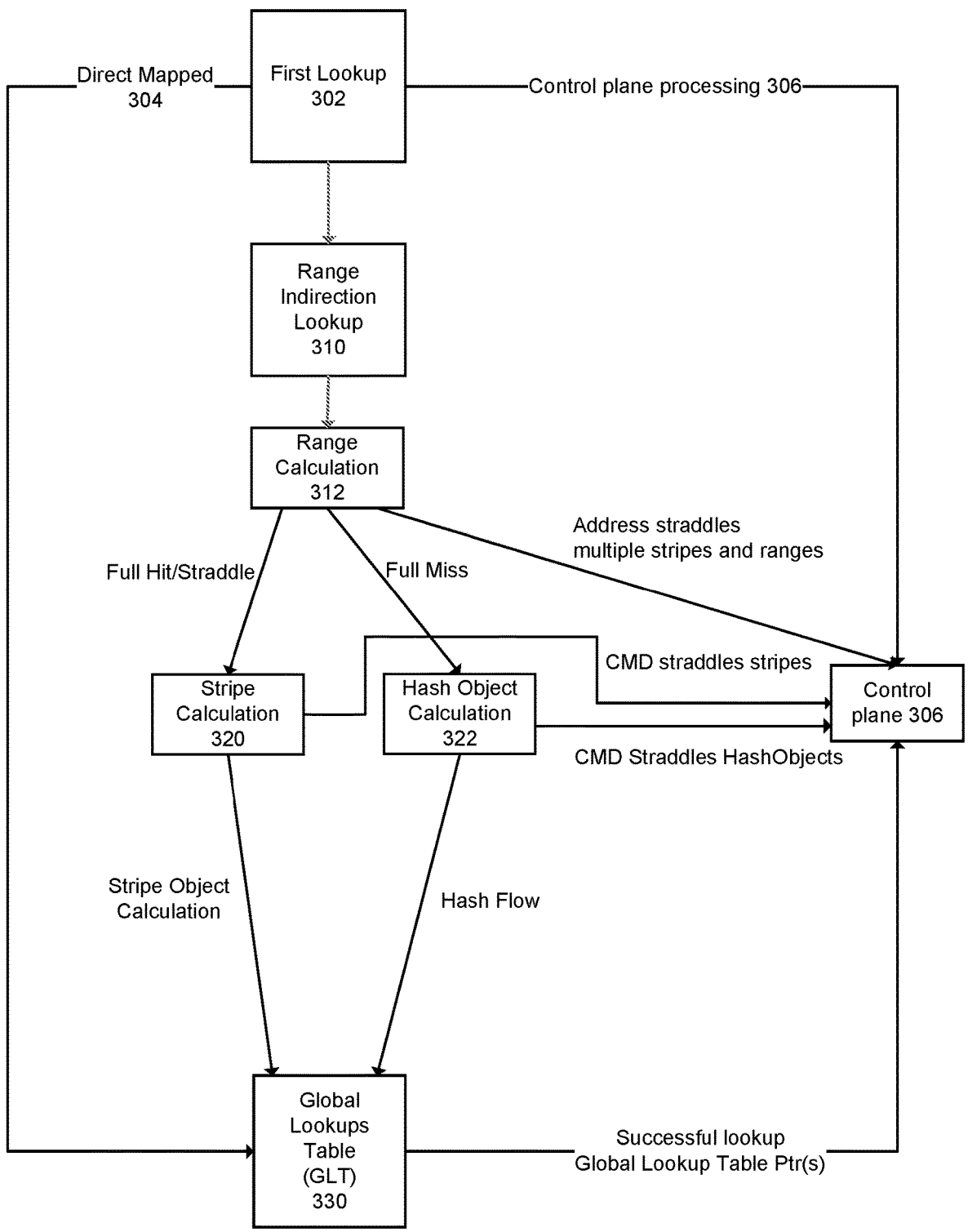
FIG. 3 depicts an example process.

FIG. 3 depicts an example process. The process can be performed by a network interface device based on receipt of an NVMe command or other command to access a memory or storage device. A first lookup 302 can use the Name Space ID (NSID) associated with the NVMe command to determine if further lookups need to be performed for this command, or if it is to be sent to the Control Plane for processing. First lookup 302 can access a pNSID Indirection Table (PIT) to determine if the command can be processed using a direct mapped operation 304 or processed using a control plane 306.

If further lookups are to be performed to issue the command, PIT can indicate lookups that are to be performed. Look ups can include Range Indirection Lookups (for storage that is sharded across storage targets); Striping Lookups (for storage that is striped across storage targets); or Hashing Lookups (for object storage).

Range indirection lookups 310 and range calculation 312 can identify one or more object sets for an input LBA start address and range. For example, one or more object sets can be associated with a range start and end and based on the input LBA start address and range fitting within the range start and end, the object set can be identified. The command's LBA start address and range may be within a stripe of data or straddle multiple stripes.

Stripe calculation 320 can be performed for a situation where an address range fits into a stripe, the address range fits into one object and the command can be sent to a single target. Stripe calculation 320 can be performed for a situation where an address range associated with a command straddles multiple stripes. In some scenarios, where an address range associated with a command straddles multiple stripes, multiple object IDs and commands can be sent to multiple storage targets by the network interface device.

For a situation where a command's block addresses fit into no object or object set address range (full miss), range calculation 312 can cause hash calculation 322 to be performed to determine a pointer to a table to lookup a target or targets for the command or an exception can be generated and the command directed to control plane software for processing. For example, one or more Jenkins Hash calculations can be performed for object straddling. In some scenarios, where an address range associated with a command straddles multiple objects, the command can be processed by control plane 306.

Hash calculation 322 can determine which hash object mapping to a command. A striped object may be a different size than that of a hash object. A string or web address can be used to access a storage volume of a storage target. For example, an ASCII string can be subjected to a hash calculation. For example, a modulo of a 32 bit value can be used to determine a pointer to large pointer table (e.g., Global Lookup Table (GLT)), described herein.

A range can represent one or more object sets. If a command straddles two objects, then range calculation 312 can split the command into two fabric commands (fCMDs). If a command straddles two ranges, range calculation 312 can invoke an exception and send the command to control plane 306 for processing. Control plane 306 can handle exceptions as provisioned by an operator of the network interface device.

For a case where a stripe object calculation or hash flow is found from a range lookup, striping lookup, or hashing lookup, a lookup in the Global Lookup Table (GLT) can be performed to generate an entry of RDMA {connection_id, fabric NSID (fNSID)} that the NVMe command maps-to. The entry can be used to generate one or more packet header fields for an NVMe command that directs the one or more packets to a specific target through a network. In some examples, the Global Lookup Table pointer(s) to RDMA {connection_id, fabric NSID (fNSID)} can be programmed into control plane 306.

Figure 4:
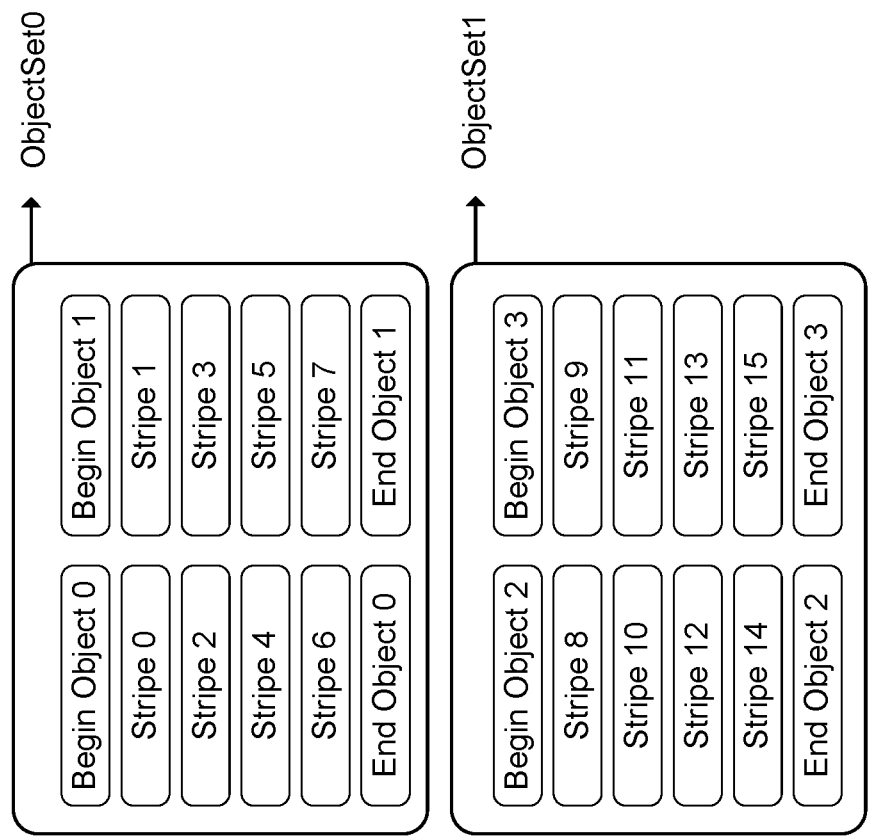
FIG. 4 depicts an example of objects and object sets.

FIG. 4 depicts an example of mapping a range of logical blocks into Object Sets and Objects. In some examples, a LB can fit within an object stripe, straddle stripes of different objects, or straddle two object sets. In this example, there are two object sets, ObjectSet0 and ObjectSet1. ObjectSet0 can include Object 0 and Object 1. Object 0 of ObjectSet0 can include stripes 0, 2, 4, and 6. Object 1 of ObjectSet0 can include stripes 1, 3, 5, and 7. ObjectSet1 can include Object 2 and Object 3. Object 2 of ObjectSet1 can include stripes 8, 10, 12, and 14. Object 3 of ObjectSet1 can include stripes 9, 11, 13, and 15. Other examples can include different numbers of stripes, objects, and/or object sets.

Figure 5:
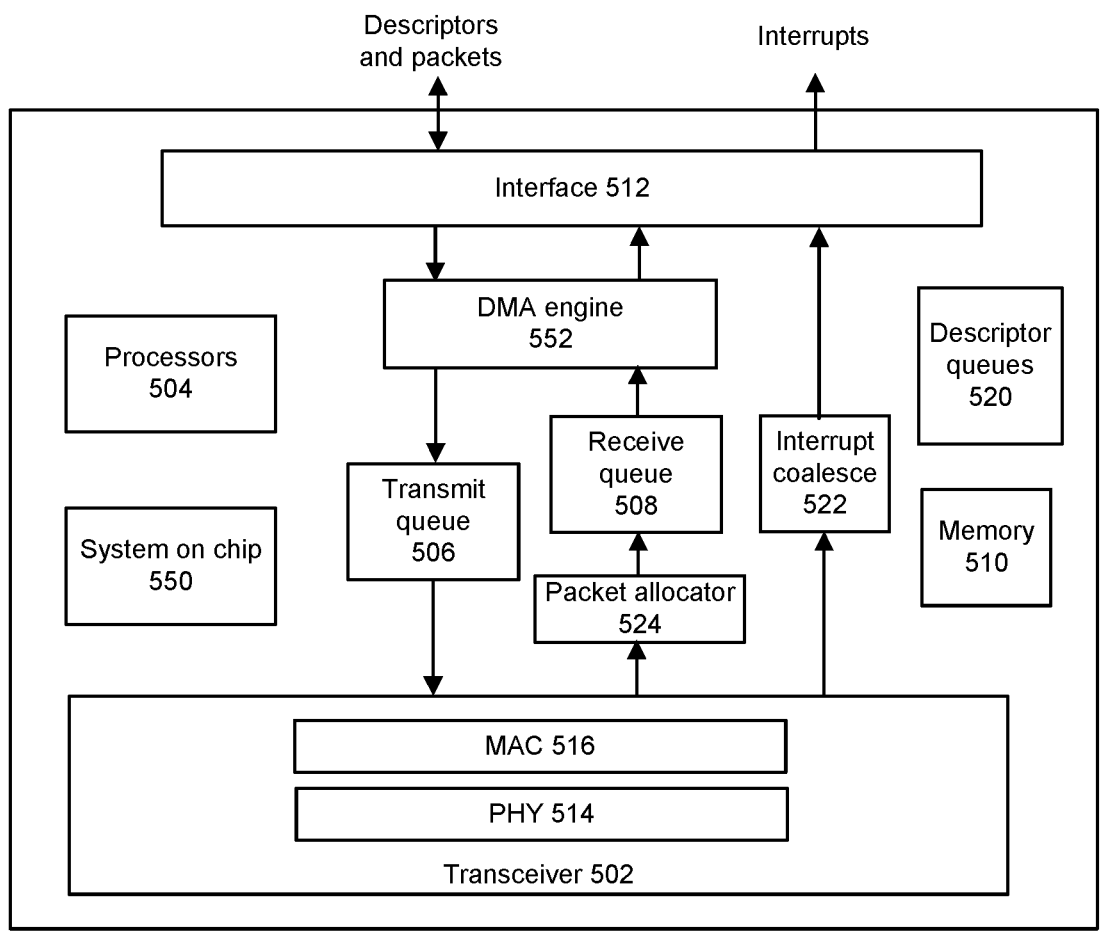
FIG. 5 depicts an example network interface device.

FIG. 5 depicts an example network interface device. The network interface device can include processors to determine a storage target based on a received storage access command using one or more of entry lookup, hash calculation, or control plane processing, as described herein. Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to assemble data to be transmitted into packets, that include destination and source addresses along with network control information and error detection hash values.

Processors 504 can be any a combination of a: processor, core, graphics processing unit (GPU), field programmable gate array (FPGA), application specific integrated circuit (ASIC), or other programmable hardware device that allow programming of network interface 500. For example, a "smart network interface" can provide packet processing capabilities in the network interface using processors 504. Configuration of operation of processors 504, including its data plane, can be programmed using Programming Protocol-independent Packet Processors (P4), C, Python, Broadcom Network Programming Language (NPL), or x86 compatible executable binaries or other executable binaries. Processors 504 and/or system on chip 550 can execute instructions to determine a storage target based on a received storage access command using one or more of entry lookup, hash calculation, or control plane processing, as described herein.

Packet allocator 524 can provide distribution of received packets for processing by multiple CPUs or cores using timeslot allocation described herein or RSS. When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with PCI, PCI Express, PCI-x, Serial ATA, and/or USB compatible interface (although other interconnection standards may be used).

Figure 6:
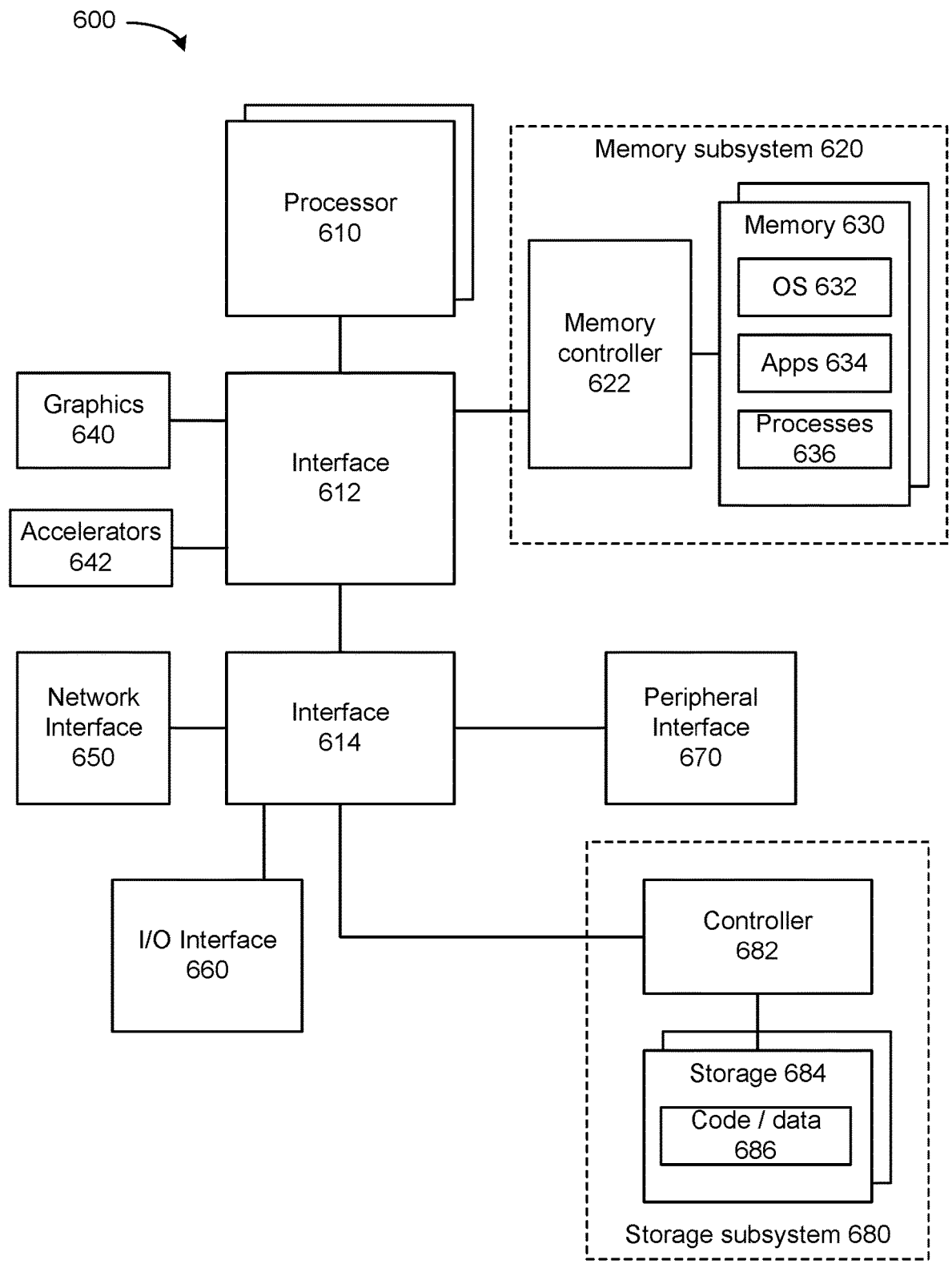
FIG. 6 depicts an example system.

FIG. 6 depicts a system. The system can use embodiments described herein to offload to network interface 650 performance of determining a storage target based on a received storage access command using one or more of entry lookup, hash calculation, or control plane processing, as described herein. System 600 includes processor 610, which provides processing, operation management, and execution of instructions for system 600. Processor 610 can include any type of microprocessor, central processing unit (CPU), graphics processing unit (GPU), XPU, processing core, or other processing hardware to provide processing for system 600, or a combination of processors. An XPU can include one or more of: a CPU, a graphics processing unit (GPU), general purpose GPU (GPGPU), and/or other processing units (e.g., accelerators or programmable or fixed function FPGAs). Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a display that provides an output to a user. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models to perform learning and/or inference operations.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

In some examples, OS 632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a processor sold or designed by Intel®, ARM®, AMD®, Qualcomm®, IBM®, Nvidia®, Broadcom®, Texas Instruments®, among others.

In some examples, a driver can configure network interface 650 to perform offloaded operations of determining a storage target based on a received storage access command using one or more of entry lookup, hash calculation, or control plane processing, as described herein. In some examples, a driver can enable or disable offload to network interface 650 to perform determining a storage target based on a received storage access command using one or more of entry lookup, hash calculation, or control plane processing, as described herein. A driver can advertise capability of network interface 650 to perform determining a storage target based on a received storage access command using one or more of entry lookup, hash calculation, or control plane processing, as described herein. OS 632 can communicate with a driver to determine that network interface 650 can perform determining a storage target based on a received storage access command using one or more of entry lookup, hash calculation, or control plane processing, as described herein. OS 632 can command the driver to turn on the capability of network interface 650 to perform determining a storage target based on a received storage access command using one or more of entry lookup, hash calculation, or control plane processing, as described herein.

In some examples, operating system 632 can provide commands to network interface 650 (e.g., NVMe commands) using a device driver as though network interface 650 were an NVMe-consistent storage device and network interface device 650 can determine a storage target based on a received storage access command using one or more of entry lookup, hash calculation, or control plane processing, as described herein. In some examples, the target storage device is direct attached to network interface 650 using a device interface. In some examples, the target storage device is direct attached to system 600 using a device interface.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices)

over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes one or more examples, and includes an apparatus comprising: a network interface device comprising circuitry to perform operations, offloaded from a host, to identify at least one locator of at least one target storage associated with a storage access command based on operations selected from among multiple available operations, wherein the available operations comprise two or more: entry lookup by the network interface device, hash-based calculation on the network interface device, or control plane processing on the network interface device.

Example 2 includes one or more examples, wherein the target storage comprises one or more of: a server, cluster of servers, gateway, or one or more storage devices.

Example 3 includes one or more examples, wherein the entry lookup by the network interface device is based on a logical block address range associated with the storage access command and a mapped logical block range and comprises determine the at least one locator of at least one target storage associated with a storage access command based on a look-up table.

Example 4 includes one or more examples, wherein the determine the at least one locator of at least one target storage associated with a storage access command based on a look-up table comprises: determine the at least one locator of at least one target storage associated with a storage access command based on data associated with the storage access command being associated with a single object, multiple objects, or multiple object sets.

Example 5 includes one or more examples, wherein the hash-based calculation on the network interface device is based on a logical block address associated with the storage access command and a mapped logical block range and comprises determine the at least one locator of at least one target storage based on a hash-based calculation.

Example 6 includes one or more examples, wherein the control plane processing on the network interface device is based on a logical block address associated with the storage access command and a mapped logical block range and comprises one or more of: process the storage access command and cause the storage access command to be transmitted, update tables accessed by the entry lookup by the network interface device, or perform flow learning to determine a manner to process other commands a same flow as that of the storage access command.

Example 7 includes one or more examples, wherein the at least one locator of at least one target storage comprises at least one remote direct memory access (RDMA) connection identifier and at least one fabric namespace identifier (NSID).

Example 8 includes one or more examples, wherein the network interface device comprises circuitry to cause one or more packets to be transmitted to the at least one target storage and wherein the one or more packets include one or more commands based on the storage access command.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance or smart end point.

Example 10 includes one or more examples, and includes a server coupled to the network interface device, wherein the server is to request performance of the storage access command and wherein the storage access command is consistent with Non-volatile Memory Express over fabrics (NVMe-oF).

Example 11 includes one or more examples, and includes a data center comprising a second server to receive at least one packet that comprises the storage access command from the network interface device, wherein the second server comprises the at least one target storage.

Example 12 includes one or more examples, and includes a computer-readable medium comprising instructions stored thereon, that if executed by one or more processors, cause the one or more processors to: offload mapping of Non-volatile Memory Express (NVMe) commands to remote disaggregated target storages by use of one of multiple available operations at a network interface device.

Example 13 includes one or more examples, and includes instructions stored thereon, that if executed by one or more processors, cause the one or more processors to: execute an operating system to provide the NVMe commands via a driver to the network interface device to perform a storage access operation.

Example 14 includes one or more examples, wherein the remote disaggregated target storages comprises one or more of: a server, cluster of servers, gateway, or one or more storage devices.

Example 15 includes one or more examples, wherein the multiple available operations at a network interface device comprise: entry lookup by the network interface device, hash-based calculation on the network interface device, or control plane processing on the network interface device.

Example 16 includes one or more examples, wherein the entry lookup by the network interface device is based on a logical block address range associated with the storage access command and a mapped logical block range and comprises determine at least one locator of at least one target storage associated with a storage access command based on a look-up table.

Example 17 includes one or more examples, wherein the determine the at least one locator of at least one target storage associated with a storage access command based on a look-up table comprises: determine the at least one locator of at least one target storage associated with a storage access command based on data associated with the storage access command being associated with a single object, multiple objects, or multiple object sets.

Example 18 includes one or more examples, wherein the hash-based calculation on the network interface device is based on a logical block address associated with the storage access command and a mapped logical block range and comprises determine at least one locator of at least one target storage based on a hash-based calculation.

Example 19 includes one or more examples, wherein the control plane processing on the network interface device is based on a logical block address associated with the storage access command and a mapped logical block range and comprises one or more of: process the storage access command and cause the storage access command to be transmitted, update tables accessed by the entry lookup by the network interface device, or perform flow learning to determine a manner to process other commands a same flow as that of the storage access command.

Example 20 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance or smart end point.

What is claimed is:

1. An apparatus comprising:
a network interface device comprising:
a direct memory access (DMA) circuitry,
a host interface,
a network interface, and
circuitry to perform operations, offloaded from a host, to map Non-Volatile Memory Express (NVMe) commands to remote disaggregated storage locations, wherein the mapping of NVMe commands to remote disaggregated storage locations comprises identify at least one locator of at least one target storage associated with a storage access command based on operations selected from among multiple available operations and wherein the multiple available operations comprise two or more: entry lookup by the network interface device, hash-based calculation on the network interface device, or control plane processing on the network interface device.

2. The apparatus of claim 1, wherein the at least one target storage comprises one or more of:
a server, cluster of servers, gateway, or one or more storage devices.

3. The apparatus of claim 1, wherein the entry lookup by the network interface device is based on a logical block address range associated with the storage access command and a mapped logical block range and comprises determine the at least one locator of at least one target storage associated with the storage access command based on a look-up table.

4. The apparatus of claim 3, wherein the determine the at least one locator of at least one target storage associated with the storage access command based on the look-up table comprises:
determine the at least one locator of at least one target storage associated with a storage access command based on data associated with the storage access command being associated with a single object, multiple objects, or multiple object sets.

5. The apparatus of claim 1, wherein the hash-based calculation on the network interface device is based on a logical block address associated with the storage access command and a mapped logical block range and comprises determine the at least one locator of at least one target storage based on a hash-based calculation.

6. The apparatus of claim 1, wherein the control plane processing on the network interface device is based on a logical block address associated with the storage access command and a mapped logical block range and comprises one or more of: process the storage access command and cause the storage access command to be transmitted, update tables accessed by the entry lookup by the network interface device, or perform flow learning to determine a manner to process other commands a same flow as that of the storage access command.

7. The apparatus of claim 1, wherein the at least one locator of at least one target storage comprises at least one remote direct memory access (RDMA) connection identifier and at least one fabric namespace identifier (NSID).

8. The apparatus of claim 1, wherein the network interface device comprises circuitry to cause one or more packets to be transmitted to the at least one target storage and wherein the one or more packets include one or more commands based on the storage access command.

9. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance or smart end point.

10. The apparatus of claim 1, comprising a server coupled to the network interface device, wherein the server is to request performance of the storage access command and wherein the storage access command is consistent with Non-volatile Memory Express over fabrics (NVMe-oF).

11. The apparatus of claim 10, comprising a data center comprising a second server to receive at least one packet that comprises the storage access command from the network interface device, wherein the second server comprises the at least one target storage.

12. At least one non-transitory computer-readable medium comprising instructions stored thereon, that if executed by one or more processors, cause the one or more processors to:
offload mapping of Non-volatile Memory Express (NVMe) commands to remote disaggregated target storage locations by use of one of multiple available operations at a network interface device, wherein:
the network interface device comprises a direct memory access (DMA) circuitry, a host interface, and a network interface.

13. The computer-readable medium of claim 12, comprising instructions stored thereon, that if executed by one or more processors, cause the one or more processors to:
execute an operating system to provide the NVMe commands via a driver to the network interface device to perform a storage access operation.

14. The computer-readable medium of claim 12, wherein the remote disaggregated target storage locations are associated with one or more of: a server, cluster of servers, gateway, or one or more storage devices.

15. The computer-readable medium of claim 12, wherein the multiple available operations at the network interface device comprise: entry lookup by the network interface device, hash-based calculation on the network interface device, or control plane processing on the network interface device.

16. The computer-readable medium of claim 15, wherein the entry lookup by the network interface device is based on a logical block address range associated with a storage access command and a mapped logical block range and comprises determine at least one locator of at least one target storage associated with the storage access command based on a look-up table.

17. The computer-readable medium of claim 16, wherein the determine the at least one locator of at least one target storage associated with a storage access command based on a look-up table comprises:

determine the at least one locator of at least one target storage associated with the storage access command based on data associated with the storage access command being associated with a single object, multiple objects, or multiple object sets.

18. The computer-readable medium of claim 15, wherein the hash-based calculation on the network interface device is based on a logical block address associated with a storage access command and a mapped logical block range and comprises determine at least one locator of at least one target storage based on a hash-based calculation.

19. The computer-readable medium of claim 15, wherein the control plane processing on the network interface device is based on a logical block address associated with a storage access command and a mapped logical block range and comprises one or more of: process the storage access command and cause the storage access command to be transmitted, update tables accessed by the entry lookup by the network interface device, or perform flow learning to determine a manner to process other commands a same flow as that of the storage access command.

20. The computer-readable medium of claim 12, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance or smart end point.

21. The apparatus of claim 1, wherein to map Non-Volatile Memory Express (NVMe) commands to remote disaggregated storage locations comprises determine one or more pointers to Queue Pairs (QPs) and remote direct memory access (RDMA) connection contexts for an NVMe command by lookup or calculation or send the NVMe command to a control plane for further processing.

* * * * *